United States Patent [19]
Ratliff et al.

[11] Patent Number: 6,088,185
[45] Date of Patent: Jul. 11, 2000

[54] ROTATIONAL VIBRATION DETECTION USING A VELOCITY SENSE COIL

[75] Inventors: Ryan T. Ratliff, Oklahoma City; Roy L. Wood, Yukon; Lealon R. McKenzie, Edmond; Otis L. Funches, Oklahoma City, all of Okla.

[73] Assignee: Seagate Technology, Inc., Scotts Valley, Calif.

[21] Appl. No.: 09/286,203

[22] Filed: Apr. 5, 1999

Related U.S. Application Data

[60] Provisional application No. 60/088,073, Jun. 5, 1998.

[51] Int. Cl.[7] ................................................ G11B 5/596
[52] U.S. Cl. .................................... 360/77.03; 360/60
[58] Field of Search ........................... 360/60, 75, 77.02, 360/77.03, 78.04, 78.11, 77.05, 77.08

[56] References Cited

U.S. PATENT DOCUMENTS

| | | | |
|---|---|---|---|
| 4,040,103 | 8/1977 | White . | |
| 4,297,734 | 10/1981 | Laishley et al. . | |
| 4,692,915 | 9/1987 | Moriya et al. . | |
| 4,799,112 | 1/1989 | Bremmer et al. . | |
| 4,914,644 | 4/1990 | Chen et al. . | |
| 4,947,093 | 8/1990 | Dunstan et al. | 360/75 X |
| 5,036,506 | 7/1991 | Bierhoff . | |
| 5,235,472 | 8/1993 | Smith . | |
| 5,251,484 | 10/1993 | Mastache . | |
| 5,254,920 | 10/1993 | Agarwal et al. . | |
| 5,299,075 | 3/1994 | Hanks . | |
| 5,426,545 | 6/1995 | Sidman et al. | 360/78.09 |
| 5,452,612 | 9/1995 | Smith et al. . | |
| 5,491,394 | 2/1996 | Harwood et al. | 360/60 X |
| 5,654,840 | 8/1997 | Patton et al. | 360/75 |
| 5,663,847 | 9/1997 | Abramovitch . | |
| 5,805,140 | 9/1998 | Rosenberg et al. | 345/156 X |
| 5,862,113 | 1/1999 | Tsuyuguchi et al. | 369/50 |

FOREIGN PATENT DOCUMENTS

| | | |
|---|---|---|
| 0 264 535 A2 | 4/1988 | European Pat. Off. . |
| 0 306 715 A1 | 3/1989 | European Pat. Off. . |
| 0 658 894 | 6/1995 | European Pat. Off. . |
| 0 675 365 A2 | 10/1995 | European Pat. Off. . |
| 3-207063 | 9/1991 | Japan . |
| 2 011 654 | of 0000 | United Kingdom . |

OTHER PUBLICATIONS

White and Tomizuka, "Increased Disturbance Rejection in Magnetic Disk Drives by Acceleration Feedforward Control," Department of Mechanical Engineering, University of California, Berkeley, CA 94720–1740, 13th Triennial World Congress, San Francisco, USA, 1996.

Abramovitch, "Rejecting Rotational Disturbances on Small Disk Drives Using Rotational Accelerometers," Storage Technologies Department, Hewlett–Packard Laboratories, Alto, CA 94304–1126, 13th Triennial World Congress, San Francisco, USA, 1996.

*Primary Examiner*—Paul Loomis
*Assistant Examiner*—James L. Habermehl
*Attorney, Agent, or Firm*—Crowe & Dunlevy, P.C.

[57] ABSTRACT

An apparatus and method for detecting rotational vibration applied to a disc drive having a rotary actuator adjacent a rotatable disc. The actuator supports a head adjacent a recording surface of the disc and an actuator coil in a magnetic field of a magnetic circuit of a voice coil motor. A second, velocity sense coil is further coupled to the actuator and immersed in the magnetic field of the magnetic circuit, with the velocity sense coil being electrically isolated from the actuator coil. Rotational vibration is detected in relation to a sense voltage induced across the velocity sense coil as the magnetic circuit is moved relative to the velocity sense coil. A data transfer operation between the head and a host device is interrupted when the magnitude of the rotational vibration exceeds a specified magnitude. A servo circuit applies current to the actuator coil to position the head relative to the disc recording surface in relation to servo information transduced by the head, as well as in relation to the sensed voltage from the velocity sense coil.

12 Claims, 5 Drawing Sheets

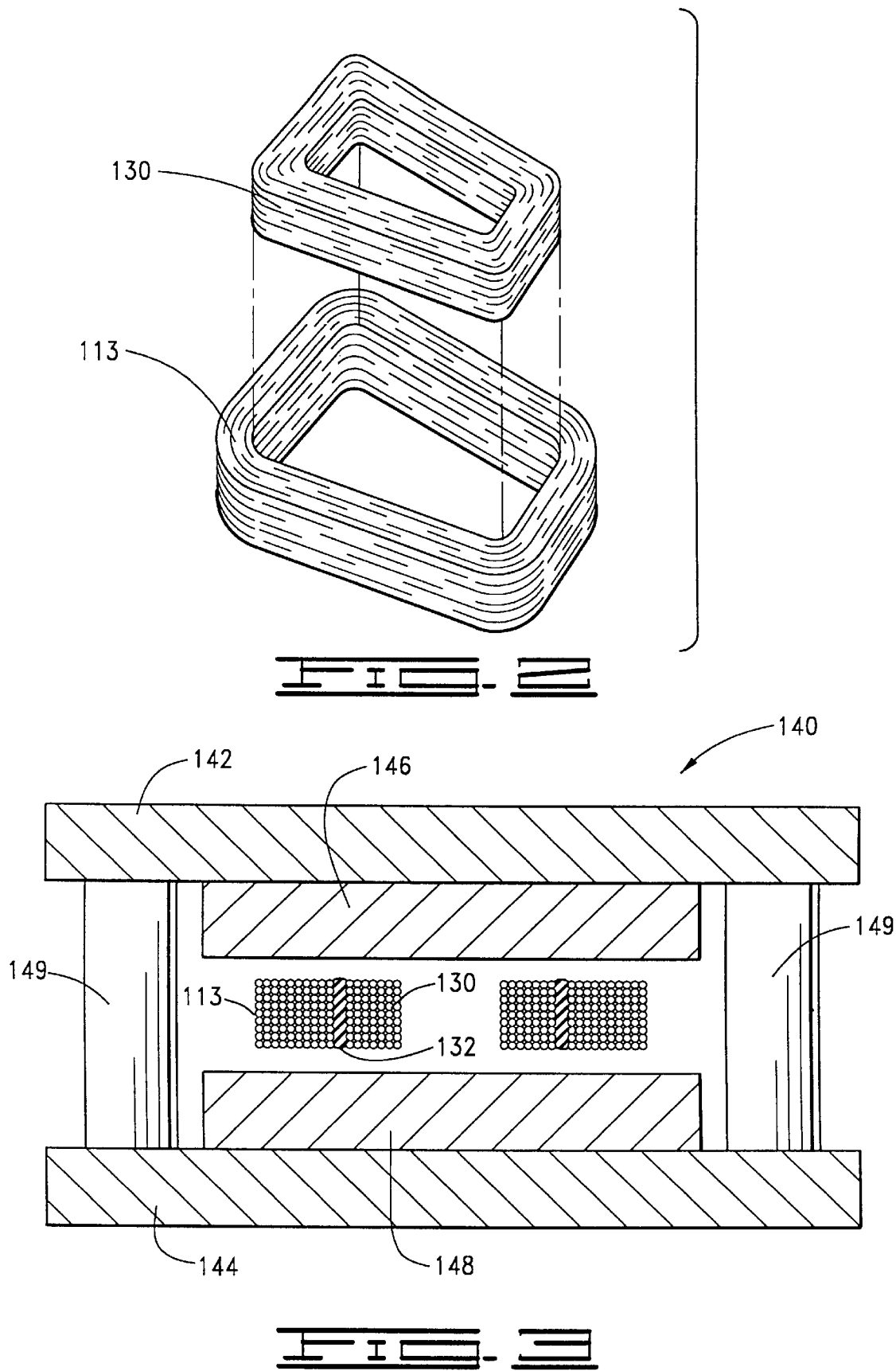

ROTATIONAL VIBRATION DETECTION USING A VELOCITY SENSE COIL

RELATED APPLICATIONS

This application claims priority to U.S. Provisional Application No. 60/088,073 entitled BOBBIN VELOCITY COIL, filed Jun. 5, 1998.

FIELD OF THE INVENTION

This invention relates generally to the field of disc drive storage devices, and more particularly, but not by way of limitation, to improving data transfer performance of a disc drive by using a velocity sense coil to detect rotational vibration applied to a disc drive.

BACKGROUND OF THE INVENTION

Disc drives are digital data storage devices which enable users of computer systems to store and retrieve large amounts of data in a fast and efficient manner. Disc drives of the present veneration have data storage capacities in excess of several gigabytes (GB) and can transfer data at sustained rates of several megabytes (MB) per second.

A typical disc drive is provided with a plurality of magnetic recording discs which are mounted to a rotatable hub of a spindle motor for rotation at a constant, high speed. An array of read/write heads are disposed adjacent surfaces of the discs to transfer data between the discs and a host computer. The heads are radially positioned over the discs by a closed loop, digital servo system, and are caused to fly proximate the surfaces of the discs upon air bearings established by air currents set up by the high speed rotation of the discs. A plurality of nominally concentric tracks are defined on each disc surface to accommodate the storage of user data.

A preamp and driver circuit (preamp) generates write currents that are used by the head to selectively magnetize the tracks during a data write operation. The preamp further amplifies read signals detected by the head during a data read operation. A read/write channel and interface circuit are operably connected to the preamp to transfer the data between the discs and the host computer.

A rigid housing is provided to support the spindle motor and the actuator and to form an internal controlled environment to minimize particulate contamination of the discs and heads. A printed circuit board is mounted to the exterior of the housing to accommodate the disc drive control electronics (including the aforementioned servo circuit, read/write channel and interface circuit).

Disc drives are often used in a stand-alone fashion, such as in a typical personal computer (PC) or portable data processing/communication device where a single disc drive is utilized as the primary data storage peripheral. However, in applications requiring vast amounts of data storage capacity or high input/output (I/O) bandwidth, a plurality of drives can be arranged into a multi-drive array, sometimes referred to as a RAID ("Redundant Array of Inexpensive Discs"; also "Redundant Array of Independent Discs"). A seminal article proposing various RAID architectures was published in 1987 by Patterson et al., entitled "A Case for Redundant Arrays of Inexpensive Discs (RAID)", Report No. UCB/CSD 87/391, December 1987, Computer Science Division (EECS), University of California, Berkeley, Calif.

Since their introduction, RAIDs have found widespread use in a variety of applications requiring significant data transfer and storage capacities. It is presently common to incorporate several tens, if not hundreds, of drives into a single RAID. While advantageously facilitating generation of large scale data storage systems, however, the coupling of multiple drives within the same enclosure can also set up undesirable vibrations from excitation sources with the drives, such as spindle motors used to rotate the discs and actuators used to move the heads to various tracks on the discs. Such vibrations can be transmitted from drive to drive through chassis mounts used to secure the drives within the enclosure.

Vibrational components can be characterized as translational, or rotational in nature. Translational vibrations tend to move a disc drive housing back and forth along a plane of the drive, whereas rotational vibrations tend to rotate a disc drive housing about an axis normal to a plane of the drive. Because attempts are made to provide nominally balanced actuators, translational vibrations will generally have little effect upon the ability of the actuator to maintain the heads at a selected position with respect to the discs, as the discs and the actuator will both respond to the movement induced by such translational vibrations.

However, such is not usually true with rotational vibrations. Even with a nominally balanced actuator, rotational vibrations will tend to move the discs relative to the actuator because the actuator, acting as a free body, remains essentially undisturbed due to inertial effects while the discs, mounted to the housing, are displaced by imparted rotational vibration. When sufficiently severe, such movement will cause an "off-track" condition whereby a head is moved away from a selected track being followed. Such off-track conditions can adversely affect the ability of the drive to transfer data between the discs and host device.

The problems associated with rotational vibrations are well known in the disc drive art. Compensation attempts have included use of sensors that can detect the presence of rotational vibration in a disc drive, such as discussed in U.S. Pat. No. 5,235,472 issued Aug. 10, 1993 to Smith, assigned to the assignee of the present invention. Efforts to both detect and compensate rotational vibration using feedforward control include discussions by White and Tomizuka, "Increased Disturbance Rejection in Magnetic Disk Drives by Acceleration Feedforward Control," and Abramovitch, "Rejecting Rotational Disturbances on Small Disk Drives Using Rotational Accelerometers." Both of these papers were presented at the $13^{th}$ Triennial World Congress, San Francisco, U.S.A., 1996.

While operative, there are limitations with these and other prior art approaches to minimizing the effects of rotational vibration in a disc drive. Sensors that specifically detect rotational vibration are commercially available, but are often prohibitively expensive for use in low cost disc drive designs and are also often difficult to properly calibrate for a particular drive application. Such sensors may include a piezoelectric polymer film disposed between metallic layers that detects rotational vibration in response to torsion induced on the film, as disclosed by the aforementioned Smith U.S. Pat. No. 5,235,472 patent; another construction uses multiple piezoelectric transducers within a single component enclosure to detect rotation in relation to differences in detected motion among the transducers.

Alternatively, rotational sensors can be formed from two or more discrete linear accelerometers which detect rotational vibration in response to differences in the detected motion between the devices. While potentially less expensive to implement than an integrated rotational sensor, commercially available discrete linear accelerometers (piezo or similar construction) can have significant part-to-part output gain variation characteristics, making such unsuitable for use in a drive to detect rotational vibration without special screening and trimming operations to obtain matched sets of accelerometers.

By way of example, the aforementioned White et al. and Abramovitch references are illustrative of conventional approaches requiring use of relatively precise (and therefore expensive) accelerometers, as well as a calibration routine requiring use of a shaker table to impart vibrations of known characteristics. Such considerations make these approaches undesirable for high volume disc drive manufacturing, and prevent future adaptation of the response characteristics of a given drive to its subsequent field environment.

These references are also limited to compensating for rotational effects and do not address translational effects. However, translational effects have also been found to contribute to off-track errors due to actuator imbalance. In practice, induced vibration is seldom purely rotational or translational, but rather usually includes a combination of both.

Accordingly, as disc drive track densities and performance requirements continue to increase, there remains a continual need for improved approaches in the art to compensating for the effects of vibration in a disc drive using inexpensive and easily configured vibration sensor circuitry.

SUMMARY OF THE INVENTION

The present invention provides an apparatus and method for detecting application of rotational vibration to a disc drive.

As exemplified by presently preferred embodiments, the disc drive includes a base deck supporting a rotatable disc and a rotary actuator. The actuator supports a head adjacent a recording surface of the disc and an active actuator coil which is immersed in a magnetic field of a magnetic circuit of a voice coil motor.

A second, passive velocity sense coil is further coupled to the actuator and immersed in the magnetic field of the magnetic circuit, with the velocity sense coil being electrically isolated from the actuator coil. Rotational vibration is detected in relation to a sense voltage induced across the velocity sense coil as the magnetic circuit is moved relative to the velocity sense coil. The disc drive interrupts a data transfer operation between the head and a host device when the magnitude of the rotational vibration exceeds a specified magnitude.

In another preferred embodiment, a servo circuit applies current to the actuator coil to position the head relative to the disc recording surface in relation to servo information transduced by the head, as well as in relation to the sensed voltage from the velocity sense coil.

These and various other features as well as advantages which characterize the present invention as claimed below will be apparent from a reading of the following detailed description and a review of the associated drawings.

BRIEF DESCRIPTION OF THE DRAWINGS

FIG. 2 provides an exploded view of the velocity sense coil and an actuator coil shown in FIG. 1.

FIG. 3 provides a cross-sectional representation of the velocity sense coil and the actuator coil in conjunction with a magnetic circuit of the VCM of FIG. 1.

DETAILED DESCRIPTION

The scope of the invention disclosed herein will be defined by the appended claims; however, in order to provide sufficient information to enable those skilled in the art to practice the claimed invention, various preferred embodiments thereof will now be discussed. It will be understood that many of the following features and aspects are provided merely for purposes of illustration and to describe environments in which the claimed invention can be advantageously practiced.

Figure 1:
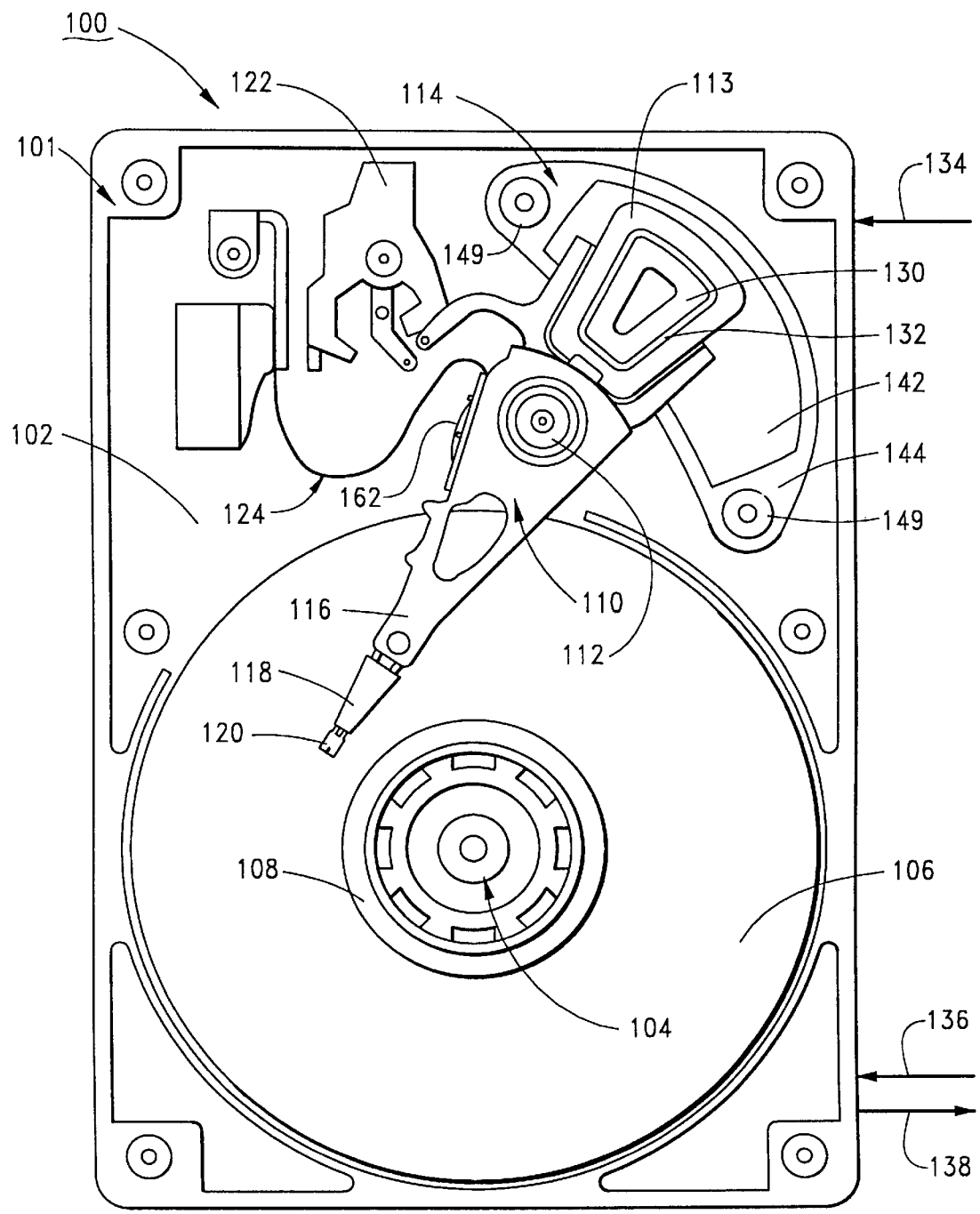
FIG. 1 provides a top plan view of a disc drive constructed in accordance with a preferred embodiment of the present invention, the disc drive including a velocity sense coil which is immersed in a magnetic field of a voice coil motor (VCM) of the disc drive and used to detect the application of rotational vibration to the disc drive.

Referring first to FIG. 1, shown therein is a top plan view of a disc drive used to store computer data. The disc drive 100 includes a head-disc assembly (HDA) 101 and a printed wiring assembly (PWA) which is mounted to the underside of the HDA and is thus not visible in FIG. 1. The PWA includes electronics used to control the operation of the HDA 101, as discussed below.

A top cover, omitted from FIG. 1 to reveal interior portions of the HDA 101, mates with a base deck 102 of the HDA 101 to provide an environmentally controlled environment for the HDA 101. A spindle motor (generally designated at 104) is supported by the base deck 102 and rotates a plurality of discs 106 at a constant high speed. A disc clamp 108 secures the discs 106 to the spindle motor 104.

The discs 106 include recording surfaces (not separately designated) to which user data are written by way of a rotary actuator 110, which rotates about a cartridge bearing assembly 112 in response to the application of current to an actuator coil 113 of a voice coil motor (VCM) 114. As will be recognized, the VCM includes a magnetic circuit (not separately designated) which establishes a magnetic field in which the actuator coil 113 is immersed. The passage of current through the actuator coil 113 sets up a magnetic field which interacts with the magnetic field of the magnetic circuit to rotate the actuator 110 about the cartridge bearing assembly 112.

A plurality of rigid arms 116 extend from the actuator 110, each of which supports a corresponding flexible suspension 118. A plurality of heads 120 are supported by the suspensions 118 over the recording surfaces of the discs 106 by air bearings established by air currents set up by the high speed rotation of the discs 106. The heads 120 are preferably characterized as magneto-resistive (MR) heads, each having a thin film inductive write element and an MR read element.

A latch 122 secures the actuator 110 when the disc drive 100 is deactivated, and a flex circuit assembly 124 facilitates electrical interconnection between the actuator 110 and the disc drive PWA.

Of particular interest in FIG. 1 is a velocity sense coil 130 which, as discussed below, is used to detect application of rotational vibration to the base deck 102 of the disc drive 100. As shown in FIG. 1, the velocity sense coil 130 is immersed in the magnetic field of the VCM 114 and operably coupled to the actuator 110, being preferably disposed within an inner aperture of the actuator coil 113. Other configurations for the velocity sense coil 130 are readily contemplated, however, such as a configuration wherein the velocity sense coil 130 is disposed about an outer perimeter of the actuator coil 113. In a preferred embodiment, the velocity sense coil 130 is affixed to the actuator coil 113 using epoxy 132 or other suitable attachment methodology. For reference, hereinafter the actuator coil 113 will also sometimes referred to as a "first" coil and the velocity sense coil 130 will also sometimes referred to as a "second" coil.

To understand the operation of the velocity sense coil 130, it will first be helpful to review the manner in which rotational vibration can adversely affect the operation of the disc drive 100. As mentioned above, vibrational effects can be characterized as translational, or rotational. By way of example, translational vibration, illustrated by acceleration vectors 134 and 136 in FIG. 1, tends to move the base deck 102 laterally along a selected plane of the disc drive 100 (in this case, along a plane generally parallel to a plane of the top disc 106). Because the actuator 110 is nominally balanced about the cartridge bearing assembly 112, both the discs 106 and the heads 120 will tend to move together, resulting in minimal head/disc displacement.

On the other hand, rotational vibration, illustrated by acceleration vectors 134 and 138, causes movement of the base deck 102 about an axis normal to a plane along which the top disc 106 extends. The discs 106 accordingly move along with the base deck 102, but the actuator 110, as a free body, remains essentially stationary in space. The resulting displacement can adversely affect a data transfer operation between the selected head 120 and the corresponding disc 106; for example, should the displacement occur during a write operation, data intended to be written to a particular track on the disc 106 might be overwritten onto an adjacent track, irretrievably corrupting the user data stored on the disc 106.

Rotational vibration will thus tend to move the base deck 102 (and hence, the magnetic circuit of the VCM 114) relative to the velocity sense coil 130, inducing a voltage in the coil. In a manner to be discussed below, such induced voltage is used by the disc drive to detect the application of rotational vibration to the drive.

Referring now to FIG. 2, shown therein is an isometric, exploded view of the velocity sense coil 130 and the actuator coil 113. FIG. 3 provides a cross-sectional representation of the velocity sense coil 130 and the actuator coil 113 in conjunction with the aforementioned magnetic circuit of the VCM 114, with the magnetic circuit being generally designated by the reference numeral 140 in FIG. 3. The magnetic circuit 140 includes top and bottom pole pieces 142, 144 (formed from stainless steel or other suitable magnetically permeable material) and top and bottom permanent magnets 146, 148, although other configurations for the magnetic circuit 140 are known in the art and can be used as desired. Standoffs 149 support the magnetic circuit in a conventional manner.

Figure 4:
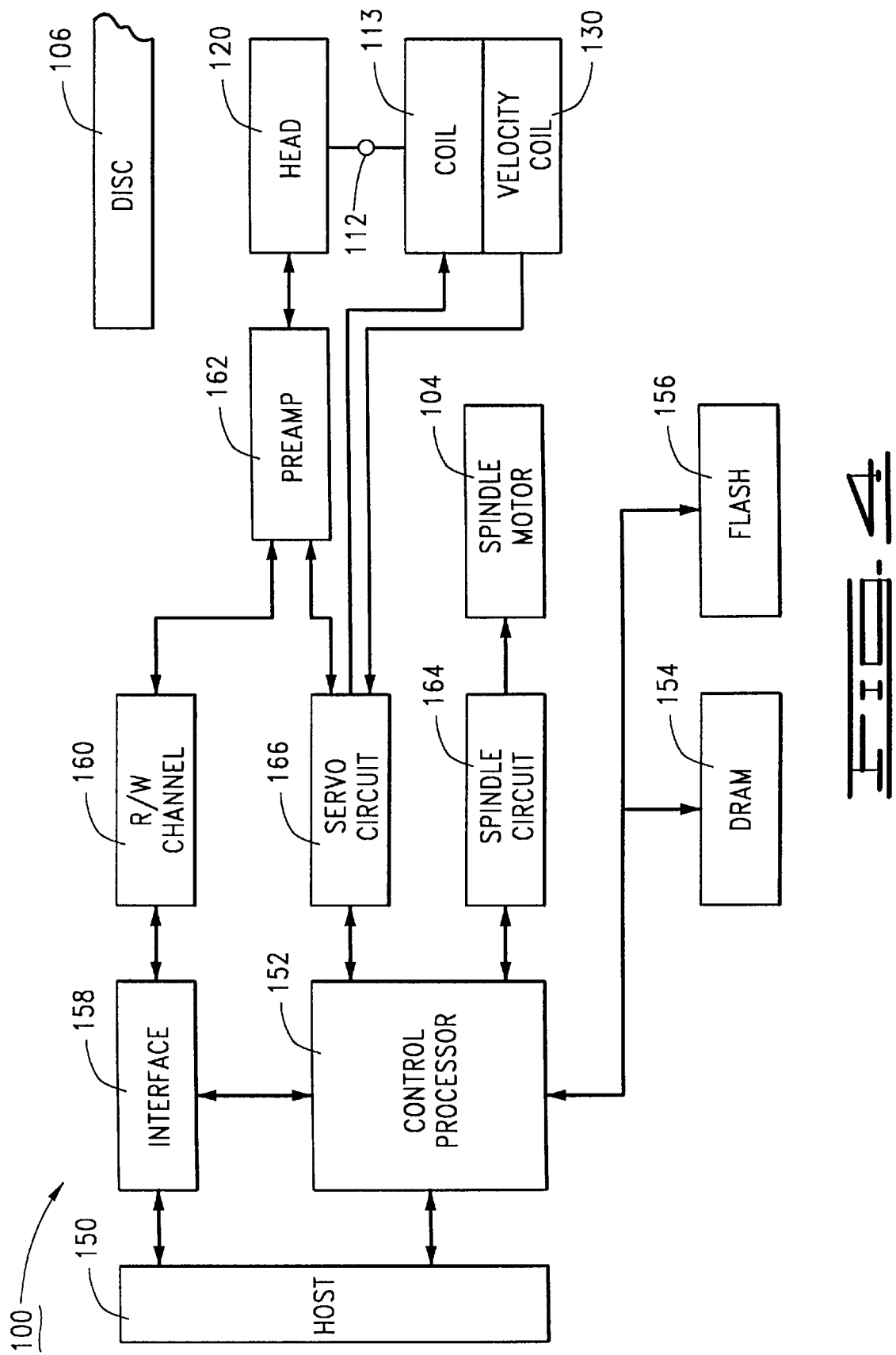
FIG. 4 provides a functional block diagram of the disc drive.

FIG. 4 provides a generalized functional block diagram of relevant portions of the disc drive 100 of FIG. 1, including circuitry disposed on the aforementioned disc drive PWA. The disc drive 100 is shown to be operably coupled to a host device 150 with which the disc drive 100 is associated. For example, the host device 150 can comprise a personal computer (PC) in which the disc drive is mounted.

A control processor 152 provides top level control of the operation of the disc drive 100 in accordance with programming and parameter values stored in dynamic random access memory (DRAM) 154 and flash memory 156. An interface circuit 158 includes a data buffer (not separately shown) for the temporary buffering of transferred data, and a sequence controller ("sequencer," also not separately shown) which directs the operation of a read/write channel 160 and a preamplifier/driver circuit (preamp) 162 during data transfer operations. The preamp 162 is preferably mounted to the actuator 110, as shown in FIG. 1.

A spindle circuit 164 is provided to control the rotation of the discs 106 through back electromotive force (bemf) commutation of the spindle motor 104. A servo circuit 166 controls the position of the selected head 120 relative to the disc 106.

Figure 5:
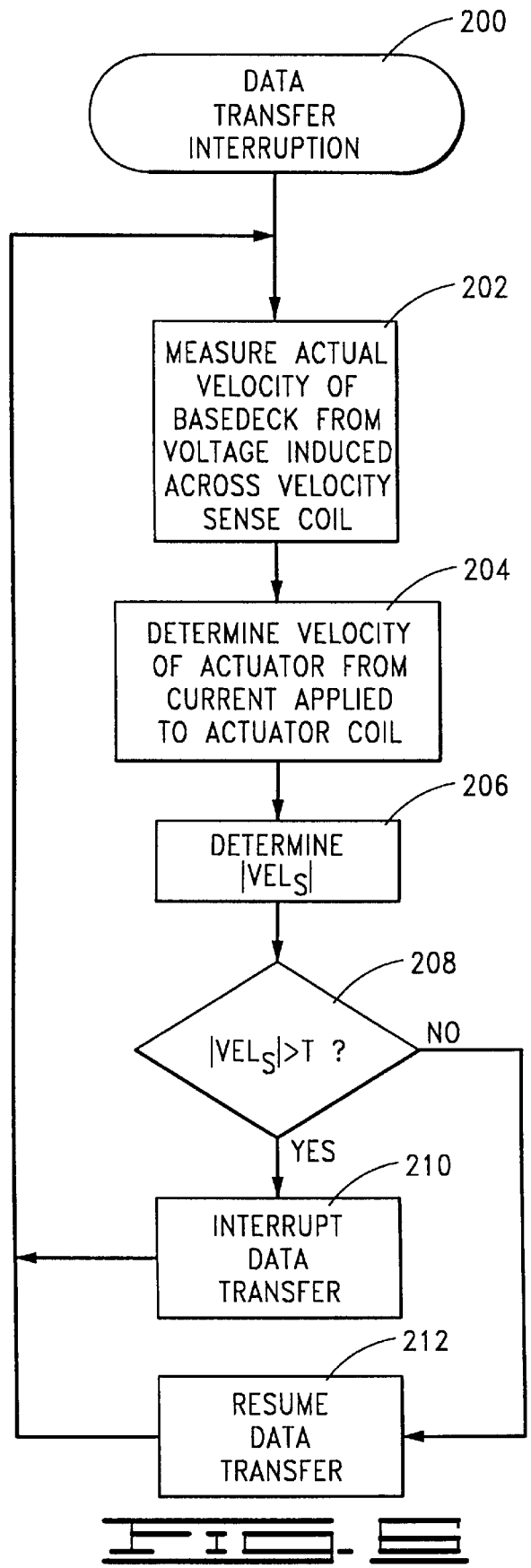
FIG. 5 provides a functional block diagram of the servo circuit of FIG. 4.

FIG. 5 provides a block diagram of the servo circuit 166 of FIG. 4, in conjunction with sense circuitry to be described as follows. During disc drive operation, servo information stored to the discs 106 is supplied to an automatic gain control (AGC) block 168 which adjusts the input signal amplitude to a range suitable for remaining portions of the circuit. A demodulator (demod) 170 conditions the servo information, including analog-to-digital (A/D) conversion, and provides the same to a digital signal processor (DSP) 172.

In response to the servo information, commands provided by the control processor 152 (FIG. 4) and programming stored in DSP memory (MEM) 174, the DSP 172 outputs a current command signal to a coil driver circuit 176 which in turn applies a current $I_c$ to the actuator coil 113 in order to position the selected head 120 relative to the tracks on the corresponding disc 106. With reference to both FIGS. 3 and 4, a primary servo path (or loop) is thus established by the head 120, preamp 162, AGC 168, demod 170, DSP 172, coil driver 176 and actuator coil 113.

Additionally, FIG. 4 shows the velocity sense coil 130 to be operably connected to an amplifier (amp) 178, which outputs a voltage signal in relation to a voltage $V_s$ sensed across the velocity sense coil 130. The output signal, indicative of rotational velocity of the magnetic circuit 140 (FIG. 3) relative to the coil 130, is converted to digital form by way of an analog-to-digital (A/D) converter 180. The digital signal, representative of rotational velocity of the velocity sense coil 130 (and accordingly designated as RV), is provided to the DSP 172, as well as to a differentiator 182.

The RV signal is differentiated by a differentiator 182 and filtered using a lead/lag filter 184 to provide a rotational acceleration signal RA to the DSP 172. A secondary, velocity sense path is thus established by the velocity sense coil 130, amp 178, A/D 180, differentiator 182 and filter 184. For reference, at least the amp 178 will sometimes also be referred to as "sense circuitry," as it is used to sense rotational vibration in relation to the sense voltage impressed across the velocity sense coil 130. However, it will be appreciated that other configurations of circuitry can readily be used to sense a voltage across a coil such as the coil 130, so that the circuitry of FIG. 5 is merely illustrative and is not limiting to the scope of the claims provided below.

From FIG. 5 it can be seen that the velocity sense coil 130 is not part of the actuator coil 130, but instead is electrically isolated from the actuator coil 113, in that current applied to the actuator coil 113 by the coil driver 176 does not pass through the velocity sense coil 130 (note the separate connection paths for the coils 113, 130), ignoring effects of any electromechanical coupling that may exist between the two coils 113, 130.

Figure 6:
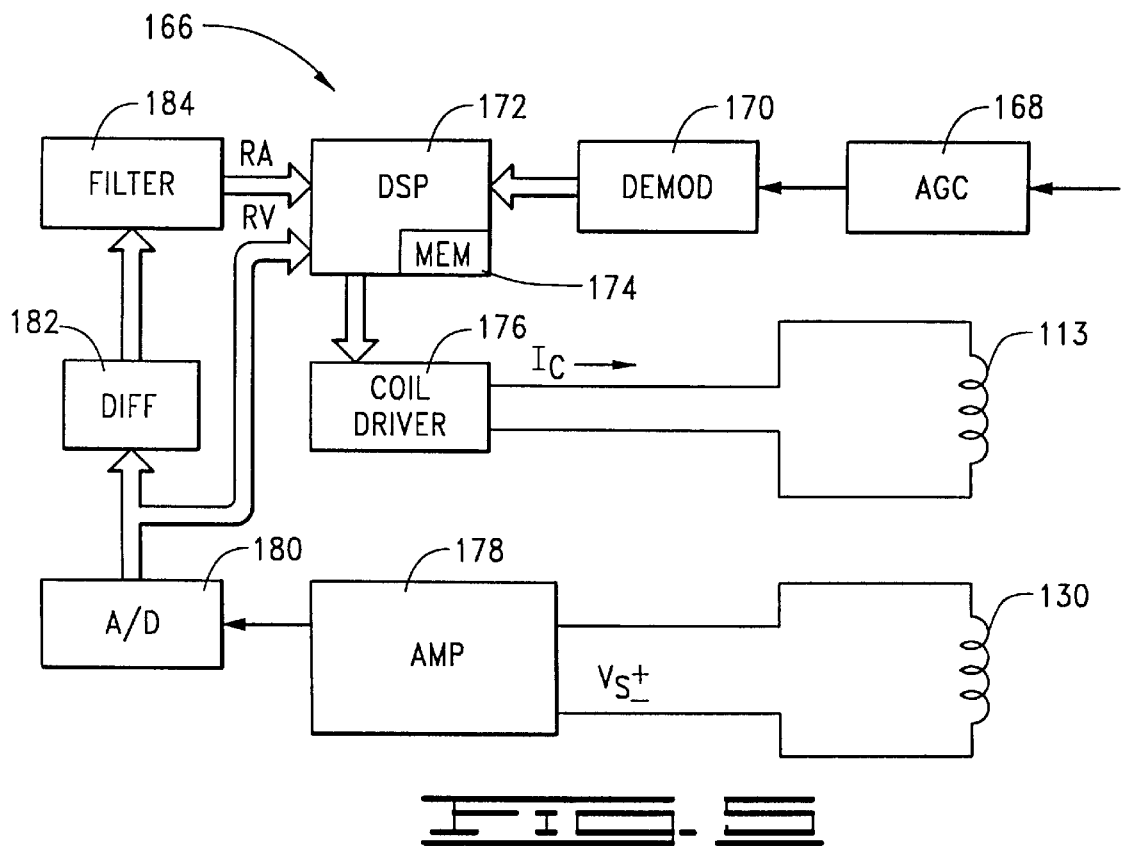
FIG. 6 provides a generalized flow chart for a DATA TRANSFER INTERRUPTION routine, representative of programming utilized by the DSP to temporarily interrupt a data transfer operation between the disc drive and a host device when a magnitude of rotational vibration exceeds a predetermined threshold.

Moreover, it will be understood that, in a preferred embodiment, the RV signal is used to detect the presence of rotational vibration and to interrupt a data transfer operation when the magnitude of the rotational vibration is sufficiently severe. To this end, FIG. 6 has been provided which sets forth a generalized flowchart for a DATA TRANSFER INTERRUPTION routine 200, representative of programming stored in DSP memory 174 and utilized by the DSP 172 during operation. It will be appreciated that the routine of FIG. 6 is a top level routine performed as part of other continuously executing programming steps of the DSP 172 during disc drive operation.

As shown at step 202, the routine first determines the magnitude of the RV signal obtained from the velocity sense coil 130. As discussed above with regard to FIG. 5, this value is provided to the DSP 172 by the A/D 180. However, it will be noted that the RV signal will only be indicative of actual relative movement between the magnetic circuit 140 and the velocity sense coil 130; such movement can take place due to rotational vibration, from the application of current to the actuator coil 113, or a combination of both. It is therefore desirable to determine what portion (if any) of the induced voltage across the velocity sense coil 130 is established through application of current to the actuator coil 113, and this operation is set forth by step 204 in FIG. 6. This information, of course, is available in relation to the current command signal issued by the DSP 172 to the coil driver 176.

A magnitude of a sensed velocity ($VEL_s$) is accordingly determined at step 206 in relation to the difference between the values determined by steps 202 and 204, and the absolute value of this magnitude is compared to a predetermined threshold T at decision step 208, with the threshold T preferably being selected to correspond to a level above which the servo circuit 166 cannot adequately reject the applied rotational vibration; that is, the threshold T preferably identifies when a magnitude of the rotational vibration applied to the disc drive 100 exceeds a specified magnitude, such as, for example, 21 radians per second$^2$ (rads/sec$^2$), over a frequency range of interest, such as, for example, from 20 hertz (Hz) to 800 Hz.

At such time that the magnitude exceeds the threshold T, a data transfer operation (such as a read or a write operation) is temporarily interrupted, as indicated by step 210; alternatively, when the magnitude of $VET_s$ does not exceed the threshold T, the data transfer operation is not interrupted, step 212. Such interruption can be carried out in a variety of ways, depending upon the configuration of a particular drive. For example, the DSP 172 can issue a flag to the control processor 152 (FIG. 4), which in turn can direct the read/write channel 160 to temporarily suspend operation. The routine of FIG. 7 accordingly passes back through at an appropriate sampling rate to monitor the $VEL_s$ value and, as necessary, temporarily suspend data transfer operations of the disc drive 100 to prevent the undesirable effects of excessive rotational vibration upon drive transfer rate performance.

Figure 7:
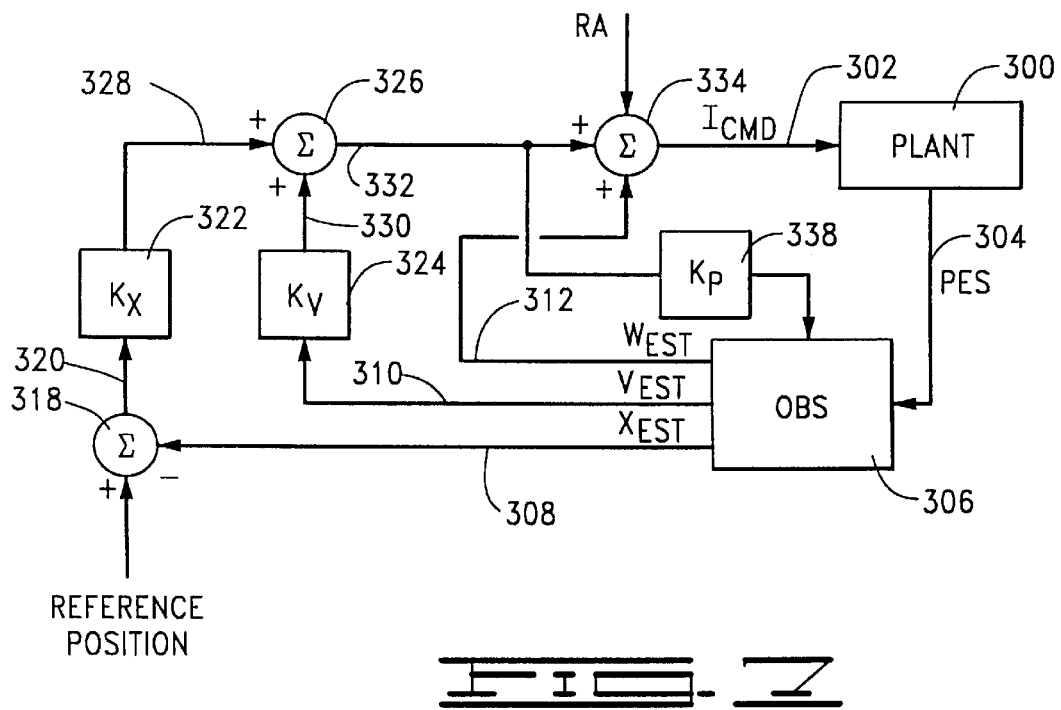
FIG. 7 is a control diagram representative of programming utilized by a digital signal processor (DSP) of the servo circuit of FIG. 5.

In a further preferred embodiment, the disc drive 100 operates to compensate for the effects of rotational vibration. Referring now to FIG. 7, shown therein is a block diagram representation of such operation of the servo circuit 166. More particularly, the block diagram representation includes modules existing in programming stored in DSP memory 174 (FIG. 5) and utilized by the DSP 172 in providing positional control while minimizing the effects of rotational vibration upon the drive.

As shown in FIG. 7, a plant block 300 is presented representative of selected electrical and mechanical aspects of the disc drive 100. For reference, the plant 300 generally includes portions of the primary loop established by the servo circuit 166 (see FIG. 5). The plant block 300 receives as an input a current command ($I_{CMD}$) signal on path 302 and, in response, outputs a position error signal (PES) on path 304 indicative of positional error in the selected head 120.

FIG. 7 further shows an observer (OBS) block 306, which generally provides a mathematical model of the plant 300 and periodically outputs estimates of head position ($X_{EST}$), velocity ($V_{EST}$) and bias ($W_{EST}$) on paths 308, 310 and 312, respectively. Bias will be understood as indicative of forces that tend to move the heads away from a selected position, such as spring forces applied by the flex circuit 124 (FIG. 1) and windage effects caused by air currents set up by the rotation of the discs 106.

The $X_{EST}$ on path 308 is summed at a summing junction 318 with a reference position (indicative of desired head position) and the output on path 320 is applied to a position gain block 322 having gain $K_X$. The $V_{EST}$ on path 310 is similarly applied to a velocity gain block 324 having gain $K_V$. The outputs of the position and velocity gain blocks 322, 324 are brought to a summing junction 326 by way of paths 328, 330, respectively.

The output (on path 332) is summed at a summing junction 334 with the $W_{EST}$ from path 312 and the RA signal (FIG. 5) to generate the $I_{CMD}$ signal on path 302. The output on path 332 is further applied to gain block 338 and fed to the observer 306. It will be noted that the sign designation for the various inputs to the summing junctions 318, 326 and 334 have been generally arbitrarily assigned and could be modified with corresponding changes in polarity of the respective signals.

Accordingly, during disc drive operation the RA signal is generated on a sampled basis and provided to the servo circuit 166 to minimize the effects of rotational vibration upon the disc drive 100. Various considerations for the implementation and operation of the circuits of FIGS. 5 and 7 for a given application, and the results of computer simulations, will now be discussed.

Generally, the effect of the velocity sense path on the servo circuit 166 can be examined by comparing the transfer functions of an angular velocity output, $\omega_0$, with respect to an input, $U_C$, for the cases where there is no feedback and when there is feedback from the velocity sense coil 130. For the first case, a z-domain transfer function for the plant, Gp(z), is generally given by the following relationship:

$$\frac{\omega_0(z)}{U_C(z)} = G_P(z) = \frac{K_i K_t T_S}{J(z-1)} \qquad (1)$$

where $K_j$ is the transconductance amp constant (amp/volt), $K_t$ is the actuator torque constant (oz-in/amp), J is the actuator arm inertia (oz-in-sec$^2$) and $T_s$ is the measurement sample period. With the feedback in place (i.e., utilizing the velocity sense path), the transfer function Gpv(z), is generally given by:

$$\frac{\omega_0(z)}{U_C(z)} = G_{PV}(z) = \qquad (2)$$

$$\frac{K_i K_t T_S}{J(z-1)} \left[ \frac{(z-kvsensf)(z-kvsef)}{(z-kvsensf)(z-kvesf) + \frac{1}{J}(K_i K_t K_b T_s K_v)(z-kvsef1)} \right]$$

where $K_b$ is the bemf constant of the velocity sense coil 130, $K_v$=(kvgain) (kvsen)(kvfga) is a gain constant and z=kvsenf, kvsef and kvsef1 are the locations of poles and zero, respectively, of the velocity sense path. The relationship given by equation (2) is only an approximation, because the product of the D/A filter and the transconductance amplifier transfer functions is assumed to be equal to one, which is a good approximation as the D/A filter poles are set at about 15 kilohertz (kHz) and the transconductance amp poles are set at about 35 kHz and 50 kHz.

It will be noted that the transfer function of equation (1) is altered by the velocity sense path such that the feedback poles become zeroes and the combination of the zero and poles gives two new poles as shown in equation (2). A typical rotational velocity frequency spectrum of interest ranges from about 20 hertz (Hz) to about 800 Hz and the bandwidth of the velocity sense path should be set sufficiently high to allow track-following performance goals be met in the presence of rotational vibration. Minimum bandwidth of the velocity sense path may be limited by actuator resonances, so that some compromise in the design of the velocity sense path may be necessary to minimize effects upon fundamental track-following characteristic transient and steady-state responses.

The design criteria for each given disc drive design will usually entail a variety of specifications for track density, write fault threshold (percentage off-track center that a head can be placed and still perform a write operation), track-follow bandwidth (crossover frequency), and track misregistration budget (TMR). These criteria will result in a requisite level of reduction (percentage) in PES error due to rotational vibration from the compensation provided by the velocity sense path (for example, a 31% reduction was found to be required in a particular design).

Coefficients for the lead/lag filter (184, FIG. 5) can be determined using various known bilinear transformation methods. In one preferred methodology, the system is designed by first setting the velocity sense path open loop gain at an arbitrary low-frequency gain value and adjusting the zeros and poles to give a crossover frequency of two times the RV spectrum. The velocity sense path can then be combined with the primary path and the characteristics of the combined paths can be examined using suitable simulation software, such as Matlab/Simulink software available from Mathworks, Inc.

From such operations it was discovered that low-frequency characteristics in the velocity sense path altered track-following capabilities of the primary path of the servo circuit. Significant reductions in RV-induced PES error could be achieved, but with a severe step response penalty. After unsuccessfully obtaining suitable results for both step and RV response, a detailed analysis revealed that the alteration of the track-following characteristics of the servo circuit could be minimized when the bandwidth of the velocity sense path was significantly higher than the bandwidth of the primary path. However, a high bandwidth velocity sense path would not generally be practical because of the possibility of loop instability due to the presence of actuator arm resonances.

A practical solution to the characteristic problem of the additional poles and zeros added to the plant response by the velocity sense path was found to be the introduction of an inverse function at the input to the plant; such function was found in some cases to substantially cancel the low-frequency poles and zeros introduced by the velocity sense path, thereby restoring much of the primary path's fundamental characteristic step response and low-frequency repeated runout (RRO) rejection. With the introduction of an inverse function Gvi(z), the additional poles and zeroes induced by the velocity sense path are essentially cancelled, so that:

$$\frac{U_C(z)}{\omega_0(z)} = Gpi(z) = \qquad (3)$$

$$\frac{K_i K_t T_S}{J(z-1)} \left[ \frac{(z-kvsensf)(z-kvesf) + \frac{1}{J}(K_i K_t K_b T_s K_v)(z-kvsef1)}{\sum (a_u z^u)} \right]$$

The polynomial in z on the right side of equation (5) reflects the imperfect cancellation between the velocity sense path poles and the inverse function zeroes, because the inverse function zeroes are based on calculation of a simplified plant forward transfer function. Nevertheless, simulation results, as discussed below, generally show the adequacy of this approach.

Particularly, simulations were performed wherein position error was characterized as a function of steady-state sinusoidal rotational vibration inputs at five discrete frequencies, namely 40, 100, 200, 400 and 800 Hz, with amplitude equivalent to 21 radians per second$^2$ (rads/sec$^2$). The simulation time used for the sinusoidal inputs was 0.02 sec, sufficient for the servo circuit 166 to reach steady-state conditions and long enough to measure peak error for the lower frequency inputs. Position error was also characterized for rotational vibration noise power input with a root mean squared (RMS) value equal to 21 rads/sec$^2$ and a spectrum of 20 to 800 Hz over a simulation time of 0.2 sec. Simulation results for configurations both without and with the velocity sense coil 130 (velocity sense path) are provided in Table 1. Position error values (set forth in the second and third columns of Table 1) are expressed first in nanometers ($1\times10^{-9}$ meters) and then in microinches ($1\times10^{-6}$ inches).

TABLE 1

| Frequency (Hz) | Peak Position Error - No Sense Coil | Peak Position Error - With Sense Coil | Percent (%) Error Reduction |
| --- | --- | --- | --- |
| 40 | 99/3.9 | 48/1.9 | 51 |
| 100 | 135/5.3 | 66/2.6 | 51 |
| 200 | 140/5.5 | 69/2.7 | 51 |
| 400 | 119/4.7 | 69/2.7 | 43 |
| 800 | 86/3.4 | 66/2.6 | 24 |
| Noise | 216/8.5 Peak | 127/5.0 Peak | 41 |
| Noise | 64/2.5 RMS | 41/1.6 RMS | 38 |

The last two rows of Table 1 reflect results for the rotational vibration noise spectrum input. In the first row for noise, the position error values are the peak error observed during the 0.2 sec simulation. The second noise row gives the calculated values of RMS position error.

From these results it will be noted that significant reductions in position error can be achieved through the addition of the velocity sense path to the primary path of the servo circuit 166. Depending upon the application, factors that may require additional consideration (and compensation efforts) include the effects of electromagnetic coupling between the actuator coil 113 and the velocity sense coil 130, changes in structural resonances of the actuator 110 as a result of the presence of the velocity sense coil 130, and the effects (if any) upon seek performance due to the additional inertia added to the actuator 110 by the velocity sense coil 130. Evaluation and compensation for these effects are well within the ability of those skilled in the art. Regardless, the embodiments presented above provide significant manufacturing and operational advantages over the prior art, including low cost and ease of integration into existing disc drive designs.

From the foregoing discussion, it will be clearly understood that the present invention is directed to an apparatus and method for detecting application of rotational vibration to a disc drive. As exemplified by presently preferred embodiments, a disc drive 100 includes a rotary actuator 110 supporting a head 120 adjacent a rotatable disc 106 and an actuator coil 113 immersed in a magnetic field of a magnetic circuit 140 of a voice coil motor 114.

A second, passive velocity sense coil 130 is further coupled to the actuator and immersed in the magnetic field of the magnetic circuit. Rotational vibration is detected in relation to a sense voltage induced across the coil as the magnetic circuit is moved relative to the velocity sense coil, and a data transfer operation between the head and a host device is interrupted when the magnitude of the rotational vibration exceeds a specified magnitude 200. A servo circuit 166 applies current to the actuator coil to position the head relative to the disc recording surface in relation to servo information transduced by the head, as well as in relation to the sensed voltage from the velocity sense coil.

For purposes of the appended claims, the terms "circuit" and "block" will be understood to be realizable in either hardware or software, in accordance with the foregoing discussion. Description of the claimed "second coil" as being "electrically isolated from the first coil" will be readily understood, consistent with the foregoing discussion, to describe the fact that separate electrical connection paths are provided for the first and second coils, so that current passed through the first coil does not pass through the second coil, irrespective of any electromechanical field coupling therebetween. The phrase "host device" will be understood to describe any device which communicates with the claimed disc drive, such as, but not limited to, the personal computer discussed above. Although method steps have been set forth in a particular order, such ordering is not necessarily limiting to the scope of the claims.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An apparatus which reduces the effects of rotational vibration applied to a disc drive having a rotary actuator which supports a head adjacent a rotatable disc and has a first coil immersed in a magnetic field of a magnetic circuit of a voice coil motor, wherein the head is moved across the disc in relation to current applied to the first coil, the apparatus comprising:

a second coil, affixed for movement with the rotary actuator and electrically isolated from the first coil, which is immersed in the magnetic field of the magnetic circuit; and a servo circuit, operably coupled to the second coil, which adjusts the current applied to the first coil in relation to a rotational acceleration signal determined by differentiating a voltage induced across the second coil from movement of the magnetic circuit relative to the second coil, wherein the rotational acceleration signal is summed as a component of the current applied to the first coil.

2. The apparatus of claim 1, wherein the disc drive interrupts a data transfer operation between the head and a host device with which the disc drive is associated when a magnitude of the rotational vibration exceeds a specified magnitude.

3. The apparatus of claim 1, wherein the servo circuit applies current to the first coil to controllably position the head adjacent the disc in relation to the voltage induced across the second coil and to servo information which is stored on the disc and transduced by the head.

4. The apparatus of claim 1, wherein the second coil is disposed within a central aperture of the first coil.

5. A disc drive, comprising:

a base deck supporting a rotatable disc and a magnetic circuit of a voice coil motor;

a rotary actuator, supported by the base deck, comprising a head adjacent the disc and a first coil immersed in a magnetic field of the magnetic circuit;

a second coil, affixed for movement with the rotary actuator and electrically isolated from the first coil, which is immersed in the magnetic field of the magnetic circuit; and a servo circuit, operably coupled to the second coil, which adjusts the current applied to the first coil in relation to a rotational acceleration signal determined by differentiating a voltage induced across the second coil from movement of the magnetic circuit relative to the second coil, wherein the rotational acceleration signal is summed as a component of the current applied to the first coil.

6. The disc drive of claim 5, wherein the servo circuit applies current to the first coil to controllably position the head and interrupts a data transfer operation between the head and a host device with which the disc drive is associated when a magnitude of the rotational vibration exceeds a specified magnitude.

7. The disc drive of claim 6, wherein the servo circuit determines a sensed velocity of the second coil relative to the magnetic circuit in relation to the voltage induced across the second coil and a magnitude of current applied to the first coil, wherein the servo circuit compares the sensed velocity to a predetermined threshold, and wherein the servo circuit interrupts the data transfer operation when the sensed velocity exceeds the predetermined threshold.

8. The disc drive of claim 6, wherein the servo circuit applies current to the first coil in relation to the voltage induced across the second coil and servo information stored on the disc and transduced by the head.

9. The disk drive of claim 5, wherein the second coil is disposed within a central aperture of the first coil.

10. A method for detecting application of rotational vibration to a base deck of a disc drive having a rotary actuator which supports a head adjacent a rotatable disc and has a first coil immersed in a magnetic field of a magnetic circuit of a voice coil motor, wherein the head is moved across the disc in relation to current applied to the first coil, the method comprising steps of:

(a) immersing a second coil in the magnetic field of the magnetic circuit, the second coil affixed to move with the rotary actuator and electrically isolated from the first coil;

(b) detecting application of rotational vibration to the base deck in relation to a sense voltage induced across the second coil;

(c) interrupting a data transfer operation between the head and a host device in relation to a magnitude of the sense voltage; and (d) controlling the application of current to the first coil in relation to a rotational acceleration signal determined by differentiating the sense voltage, wherein the rotational acceleration signal is summed as a component of the current applied to the first coil.

11. The method of claim 10, wherein the detecting step (b) further comprises steps of:

(b1) determining an actual velocity of the magnetic circuit relative to the second coil in relation to the sense voltage;

(b2) obtaining an actuator velocity relative to the magnetic circuit in relation to a magnitude of current applied to the first coil;

(b3) determining a sense velocity indicative of velocity imparted to the magnetic circuit from the application of rotational vibration in relation to the actual velocity and the actuator velocity.

12. The method of claim 11, wherein the interrupting step (c) further comprises steps of:

(c1) comparing the sense velocity to a predetermined threshold; and (c2) interrupting the data transfer operation when the sense velocity exceeds the predetermined threshold.

* * * * *